Figure 1:
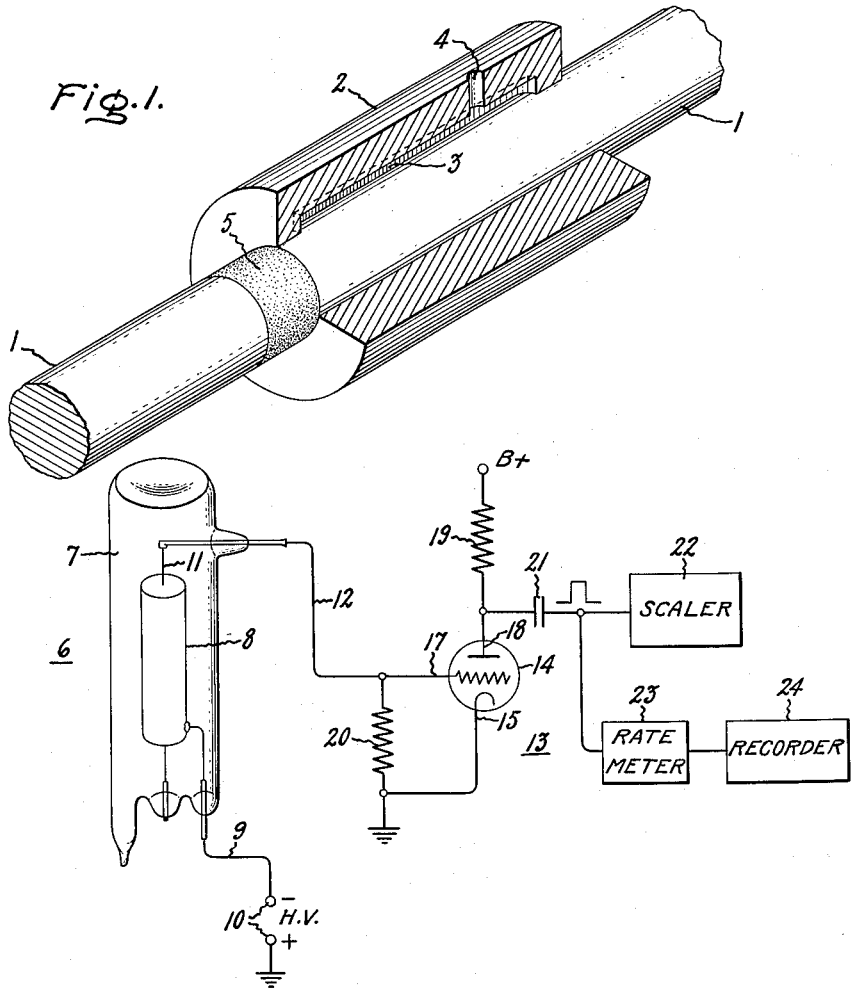

May 30, 1961    W. W. SCHULTZ    2,986,642
LEAK DETECTION
Filed March 10, 1958

REFERENCE
$Cr_{51}$ (.32 M.E.V.)

REDUCED DUE TO ABSORBTION

RADIATION ENERGY (IN M.E.V.)

RADIO ACTIVITY LEVEL PULSES/UNIT TIME

Inventor:
Warner W. Schultz,
by Merton D. Moore
His Attorney.

United States Patent Office 2,986,642
Patented May 30, 1961

2,986,642

LEAK DETECTION

Warner W. Schultz, Schenectady, N.Y., assignor to General Electric Company, a corporation of New York Filed Mar. 10, 1958, Ser. No. 720,319

9 Claims. (Cl. 250—106)

This invention relates to a method and apparatus for detecting and measuring the leakage of lubricant or other liquid through a bearing and, more particularly, a method and apparatus utilizing radioactive isotopes.

In the past it has been customary to measure bearing leakage by tagging the oil with a radioactive isotope and measuring the activity as it leaks through the bearing. While this method may be satisfactory in some circumstances, it does have serious disadvantages in that by activating the oil many parts of the machine may become contaminated requiring an expensive decontamination procedure. Furthermore, where the volume of oil is large, a rather large amount of activity may be required in order to reach the necessary sensitivity, further aggravating the problem of radioactive contamination. Hence, it is desirable to devise a method and apparatus for measuring such leakage which does not require the activation of the lubricant.

It is an object of this invention, therefore, to provide an arrangement and method for measuring lubricant leakage without activating the lubricant.

A further object of this invention is to provide a leakage measuring method which will not contaminate the apparatus.

Still another object of this invention is to provide a method for measuring oil leakage through a bearing by measuring the absorption of the radiation by the leaking oil.

Other objects and advantages of this invention will become apparent as a description of the invention proceeds.

In accordance with the invention, radioactive material is applied to a rotating shaft or the like on one side of a bearing. A radiation detector is positioned adjacent to the radioactive material and provides an electrical output proportional to the intensity of radiation. As lubricant leaks through the bearing and covers the source of radiation, the radiation is partially absorbed attenuating the output from the detector. Thus, the amount of absorption of the radiation by the leaking lubricant provides an indication both of the existence of the leak and the relative magnitude of the leakage.

Figure 2:
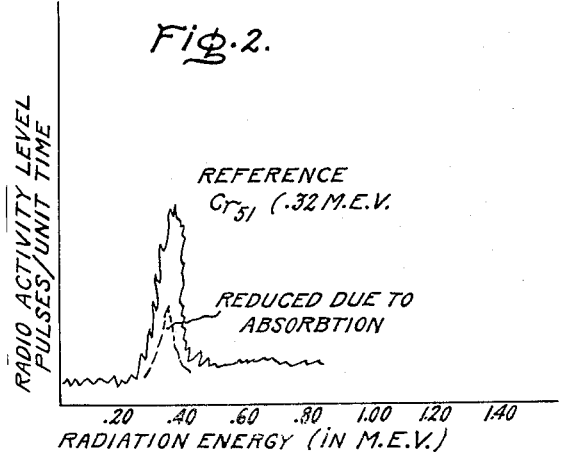

The novel features which are believed to be characteristic of the invention are set forth with particularity in the appended claims. The invention itself, however, both as to its organization and method of operation, together with further objects and advantages thereof, may best be understood by reference to the following description taken in connection with the accompanying drawing in which:

Figure 1 shows a view partially in cross section of the apparatus for carrying out the novel method; and Figure 2 is a graph useful in explaining the invention showing the energy and activity relationship for a given radio isotope.

Referring now to Figure 1 a rotating shaft 1 is journaled in a cylindrical journal bearing 2 having an axial oil groove 3 communicating with a radial oil hole 4 through which a lubricant such as oil is applied to the bearing 2. To detect leakage of lubricant through the ends of the bearing there is applied on one side of the bearing a layer of radioactive material, indicated generally at 5, to provide penetrative radiation which is absorbed as the lubricant leaks out of the bearing and covers the layer of material.

The radioactive materials are preferably radioactive isotopes which emit beta particles or low energy gamma or X-rays and are applied to the shaft as finely dispersed particles in a suspending medium such as paint. Alternatively, the radioactive material may be plated on or baked on in the form of a ceramic glaze carrying finely dispersed particles of the isotope.

Radiation from the radioactive material 5 on the shaft 1 is measured to provide an indication of leakage as well as an index of the amount of such leakage. Such measurement may be made by means of a Geiger-Mueller counter, or other suitable device, illustrated generally at 6 which produces an electrical output in response to penetrative radiation. The Geiger counter 6 comprises an evacuated glass envelope 7 containing a suitable ionizing gaseous medium and a cylindrical copper cathode 8 positioned in the envelope and connected by a suitable lead 9 to a pair of terminals 10 adapted to receive an energizing potential from a voltage source, not shown, and identified by the legend HV. The energizing voltage at the terminals 10 is of such a polarity that the cylindrical cathode 8 is maintained at a highly negative potential with respect to a reference level such as ground. Coaxial with the cathode 8 is an axial anode 11 normally maintained at ground potential and connected by means of a suitable wire 12 to a quenching circuit illustrated generally at 13, and through a resistance 20 to ground.

The principle of operation of a Geiger-Mueller counter of the type illustrated at 6 is well known and need not be discussed here at length. It is sufficient to state that the penetrative radiation, such as a beta particle or gamma ray, for example, produces ionization of the gaseous medium within the envelope 7 and in turn produces a negative output pulse at the anode 11. In order to terminate the ionization and discharge mechanism within the Geiger-Mueller counter as rapidly as possible after the occurrence of the event to facilitate detection of rapidly occurring ionizing events, the output pulse is fed to a quenching circuit 13. Thus the negative pulse from the axial wire 11 of the Geiger-Mueller counter is applied to the control grid of a vacuum triode 14. Vacuum triode 14 consists of a cathode element 15 connected to a reference level such as ground, control grid 17 connected to the axial wire 17 and an anode 18 connected to a source of energizing potential such as B+ through any convenient anode resistor 19. The control grid 17 is connected through a grid resistance 20 to the cathode 15 and hence the tube is normally in a conducting state and the grid 17 and the counter wire 11 are approximately at cathode potential.

The arrival of a negative pulse on the grid 17 causes the tube to become non-conducting, and the grid is effectively isolated for an instant. Thus the high potential is, in effect, removed instantaneously from the counter during this time causing the ionization mechanization therein to terminate. It is apparent that when the tube 14 becomes non-conducting due to the appearance of a negative pulse from counter 6, a positive pulse appears at the anode of tube 14 which is applied through a coupling capacitor 21 to a scaler 22 indicated in block diagram form which provides a measure of the number of pulses and also alternately to a rate meter 23 and a recorder 24 to determine and record the number of pulses per unit time, as a measure of the radiation level.

The Geiger-Mueller counter illustrated in Figure 1 is particularly applicable to counting beta particles. However, Geiger-Mueller counters capable of detecting gamma and X-rays are also available and reference is made to Electron and Nuclear Counters, S. A. Korff, D. Van Nostrand Company, Inc., New York, 2d Ed. (1955), and, in particular, to page 111 thereof wherein such Geiger-Mueller counters are described.

Furthermore, radiation detecting means other than Geiger-Mueller counters may be utilized such as, for example, ionization chambers, proportional counters, and scintillation counters. The particular type of counter utilized is a matter of choice depending upon such factors, as type of emitter, availability, auxiliary equipment, etc.

Furthermore, Geiger counters of the self-quenching type may obviously be utilized. That is, the termination of the ionization mechanism is accomplished within the ionizable gaseous medium rather than by an external quenching circuit such as shown in Figure 1 at 13. Reference is again made to Electron and Nuclear Counters, supra, and particularly chapter 4 thereof, which contains an excellent discussion of self-quenching counters.

Radioactive materials, and in particular the radio isotopes, which may be utilized in carrying out this invention are shown solely by way of example in the following table:

BETA (β) EMITTERS

| Radioactive Isotope | Half Life | Energy in Mev. |
|---|---|---|
| Silver 111 | 7.6 days | .7, .8, and 1.04. |
| Thalium 204 | 4.0 years | .765. |
| Calcium 45 | 163 days | .254. |
| Promethium 147 | 2.6 years | .223. |
| Sulfur 35 | 87.1 days | .167. |
| Carbon 14 | 5,568 years | .155. |
| Nickel 63 | 85 years | .067. |

GAMMA (γ) EMITTERS

| Radioactive Isotope | Half Life | Energy in Mev. |
|---|---|---|
| Antimony 124 | 60 days | .065, .642, .72, .99, etc. |
| Barium 131 | 11.52 days | .496. |
| Barium 133 | 9.5 years | .057, .082, .300, .357. |
| Cerium 141 | 32.5 days | .145. |
| Chromium 51 | 27.8 days | .32. |
| Cobalt 60 | 5.27 years | 1.17, 1.33. |
| Tin 113 | 112 days | .393. |

X-RAY EMITTERS

| Radioactive Isotope | Half Life | Energy in Mev. |
|---|---|---|
| Europium 152–154 | EU154—16 yrs | .040. |
| Iron 55 | 2.94 years | .0059 (5.9 k.e.v.) |

In carrying out the method of the invention, the shaft adjacent to one end of the bearing is coated with a layer of radioactive material by any of the methods referred to previously; i.e., baking, plating, or painting. A measure of the radiation intensity level is then taken and observed in order to provide a reference radiation intensity level. Figure 2 illustrates diagrammatically the relationship between the radioactivity level and the radiation energy level for a gamma emitting isotope such as chromium 51. The curve bearing the legend "Reference $C_{r51}$ (.32 mev.)" indicates such a radiation energy reference level curve. Subsequently, the bearing 2 is provided with lubricant through the radial oil feed hole 4. Leakage of oil through the end of the bearing covers the radioactive material 5 and at a later time the radiation level is reduced as is the output from the radiation detector. An output curve of the type illustrated on Figure 2 by the legend "Reduced due to absorption" is produced and the difference between the values represented by this reduced amplitude curve and by the curve originally obtained is then both an indication of the existence of leakage and a measure of the thickness of the lubricant layer over the radiation source.

That is, it is a well known fact that both X-rays and gamma rays decrease in intensity exponentially with absorber thickness. A condition defined by the equation:

$$I = I_0 e^{-\mu x}$$

where $I_0$ = intensity at surface
$\mu$ = the absorption coefficient
$x$ = the thickness of the absorber Consequently, the amount of attenuation of the gamma or X-rays is proportional to the thickness ($x$) of the oil film.

Similarly, where beta particles are utilized the energy loss per unit length of path of the particles varies exponentially with thickness and curves showing energy v. intensity similar to Figure 2 may be used to represent the attenuation of the radiation due to the oil film. These energy v. intensity curves, as is well known to those skilled in the art, are not as sharply defined as those for gamma or X-rays, which are monoenergetic but do have a well defined peak which may be easily identified.

In addition, it is possible to apply to the shaft a multiplicity of discrete, circumferentially spaced, axially extending, radioactive strips rather than a continuous strip as shown in Figure 1. By doing so the electrical output from the radiation sensitive device has an attenuating current component, the frequency of which is proportional to shaft speed and the amplitude to radiation intensity. Thus alternating current circuit components may be utilized in the output channel with the attendant advantages.

It is obvious from the above discussion that the greater the energy of the penetrative radiation in mev., the greater thickness of oil it is capable of penetrating and, conversely, the lower the energy of the penetrative radiation, the more quickly it will be absorbed. In order that a whole range of thicknesses may be measured it may be desirable to coat the shaft, not with a material emitting penetrative radiations of one energy level, but to mix a series of such radioactive materials to provide the most efficient penetration at various thickness levels. Thus, the shaft is coated with gamma (γ) emitting isotopes having varying levels of energy. For example, a combination of:

(1) Antimony 123 which emits gamma rays at 2.11 mev.
(2) Cobalt 60 which emits gamma rays at 1.17 mev., and
(3) Barium 131 which emits radiation at .496 mev.

provides a range of radiations of all energy levels capable of penetrating oil films of varying thickness ranges. Similarly, a combination of beta or X-ray emitters of differing energy levels may be provided to achieve the same result. Furthermore, it is possible to provide mixtures of beta, gamma, and X-ray emitting isotopes to provide whatever range of activity it is desired in the particular circumstances, in which case a multiplicity of detectors would be used.

In the event that isotopes are utilized which emit radiations of differing energy levels, consideration must be given to the fact that radiation detecting instruments have radiation conversion efficiencies which vary depending on the energy of the radiation. Thus, in a Geiger-Mueller counter, for example, the conversion efficiencies are higher for low energy radiations than for higher energy radiations and hence it becomes necessary, in order to compensate for this fact, to weight the proportions of the various emitters so as to compensate for the declining deficiency at the higher radiation energies. Thus, a larger amount by weight of the isotope having high energy radiation should be provided to achieve the best results.

In discussing the preferred mode of carrying out the invention, it has been pointed out that the shaft is coated in several ways with radioactive isotopes. Another possible approach to creating the radioactivity necessary in carrying out the instant method is to use activation techniques on a selected portion of the shaft. Thus, a portion of the shaft over which the oil flows during leakage may be activated by bombardment with heavy ions leaving a thin skin of activated material which emanates radiations of a characteristic energy level.

While a particular form of this invention has been disclosed it will, of course, be understood that it is not limited thereto since many modifications may be made. It is contemplated by the appended claims to cover any such modifications as fall within the true spirit and scope of this invention.

What I claim as new and desire to secure by Letters Patent of the United States is:

1. In a method for detecting the leakage of fluid between two relatively moving elements which provide a normal flow path for said fluid, the steps of treating a portion of one of said relatively movable elements to provide a source of penetrative radiation positioned outside of the normal flow path so that fluid flows over said source only during leakage, dynamically detecting and measuring the change of radiation intensity due to absorption during fluid leakage to determine the amount of fluid leakage.

2. In a method for detecting lubricant leakage from a bearing, the steps comprising treating a portion of a shaft journaled in a lubricated bearing adjacent to said bearing and outside of the normal lubricant path formed by said bearing and the said portion of said shaft with a beta particle emitting material so that lubricant flows thereover only during leakage, continuously detecting the beta particle emission, and measuring the change in intensity of said emission due to absorption by said lubricant as an index of lubricant leakage.

3. In a method for detecting lubricant leakage from a bearing, the steps comprising treating a portion of a shaft journaled in a lubricated bearing outside of the normal lubricant path formed by said bearing and the said portion of the shaft with a gamma radiation emitting material so that lubricant flows thereover only during lubricant leakage from said bearing, detecting the gamma radiation continuously, and measuring the change in gamma radiation intensity due to absorption by said lubricant during leakage as an index of lubricant leakage.

4. In a method for detecting lubricant leakage from a bearing, the steps comprising coating a portion of a shaft journaled in a lubricated bearing outside of the normal lubricant path formed by said bearing and the portion of said shaft with a radioactive material so that lubricant flows only during lubricant leakage, said material having a characteristic X-ray emission, continuously detecting the X-ray emission, and measuring the change in the intensity of X-ray emission due to absorption by said lubricant as an index of lubricant leakage.

5. In a method for detecting lubricant leakage from a bearing, the steps comprising coating a portion of a shaft journaled in a lubricated bearing on one side of the bearing and outside of the normal lubricant path formed by said bearing and the portion of said shaft with a radioactive material so that lubricant flows thereover only during leakage from said bearing, said material emitting penetrative radiations of different energy levels, continuously detecting the radiations of different energy levels, and measuring the change in intensity of the radiation during lubricant leakage as an index of the thickness of the lubricant film due to leakage.

6. In a method for detecting lubricant leakage from a bearing, the steps comprising coating a portion of a shaft journaled in a lubricated bearing on one side of the bearing with a radioactive material at a position that is outside of the normal lubricant path formed by said bearing and the portion of said shaft so that leaking lubricant will flow thereover only during leakage of lubricant from said bearing, said material including constituents emitting penetrative radiations of different energy levels, the amounts of each of said constituents being proportional to the energy levels of the respective radiations, continuously detecting the various radiations, and measuring the change in intensity of the respective radiations due to absorption by said lubricant as an index of lubricant leakage.

7. In a method for detecting lubricant leakage from a bearing, the steps comprising activating a portion of a shaft journaled in a lubricated bearing adjacent to the bearing and outside of the normal lubricant path formed by said bearing and the portion of said shaft with heavy ions to produce a thin layer of radioactive material so that lubricant flows thereover only during leakage, continuously detecting the radiation from the thin layer of radioactive material, and measuring the change in intensity of the radiation due to absorption by said lubricant as an index of lubricant leakage.

8. In a method for detecting lubricant leakage from a bearing, the steps comprising coating a portion of a shaft journaled in a lubricated bearing on one side of the bearing with a radioactive material at a position that is outside of the normal lubricant path formed by said bearing and the said portion of the shaft so that lubricant flows thereover only during leakage, detecting and measuring the intensity of the radiation before the bearing is lubricated as a reference level radiation, continuously detecting the radiation from said coating at a subsequent time, and measuring the change in intensity of the radiation due to lubricant leakage as an index of lubricant leakage.

9. In a method for dynamically detecting leakage of a fluid between two relatively movable elements, the steps comprising treating one of said elements to provide a source of penetrative radiation, so positioning said source of radiation with respect to the other of said elements that said source is positioned outside of the normal fluid path so that leaking fluid flows thereover and absorbs a portion of said radiation, continuously detecting the emitted radiation to indicate the presence of a leak by attenuation of the radiation intensity from said source.

References Cited in the file of this patent

UNITED STATES PATENTS

| | | |
|---|---|---|
| 2,640,936 | Pajes | June 2, 1953 |
| 2,660,678 | Sigworth et al. | Nov. 24, 1953 |
| 2,683,813 | Friedman | July 13, 1954 |
| 2,843,755 | Staker et al. | July 15, 1958 |

OTHER REFERENCES

Radioisotopes in Petroleum Refining, Research and Analysis, by Hull et al., Peaceful Uses of Atomic Energy, The United Nations, 1955, vol. 15, pages 199 to 210.